United States Patent
Ibrahim et al.

(10) Patent No.: US 12,436,773 B2
(45) Date of Patent: Oct. 7, 2025

(54) MANAGED AUTO-RESUME FOR INTERRUPTED BIOS PROCESSES

(71) Applicant: DELL PRODUCTS L.P., Round Rock, TX (US)

(72) Inventors: Sayyed Ibrahim, Georgetown, TX (US); Anand Joshi, Round Rock, TX (US); Adolfo Montero, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 220 days.

(21) Appl. No.: 18/340,349

(22) Filed: Jun. 23, 2023

(65) Prior Publication Data
US 2024/0427628 A1    Dec. 26, 2024

(51) Int. Cl.
*G06F 9/4401*    (2018.01)

(52) U.S. Cl.
CPC .................. *G06F 9/4401* (2013.01)

(58) Field of Classification Search
CPC ..................................................... G06F 9/4401
See application file for complete search history.

(56) References Cited

U.S. PATENT DOCUMENTS

| | | | |
|---|---|---|---|
| 7,069,431 B2 | 6/2006 | Dayan et al. | |
| 8,161,322 B2 | 4/2012 | Gough | |
| 11,347,570 B1* | 5/2022 | Hsu | G06F 8/654 |
| 11,409,607 B1* | 8/2022 | Hung | G06F 11/076 |
| 11,416,233 B1* | 8/2022 | R | G06F 8/63 |
| 2007/0055968 A1* | 3/2007 | Rader | G06F 8/65 |
| | | | 717/168 |
| 2011/0126043 A1* | 5/2011 | Anderson | G06F 11/1433 |
| | | | 714/6.1 |
| 2024/0311138 A1* | 9/2024 | Cheng | G06F 8/654 |

* cited by examiner

*Primary Examiner* — Glenn A. Auve
(74) *Attorney, Agent, or Firm* — Larson Newman, LLP

(57) ABSTRACT

An information handling system includes a BMC and a host processing system with a BIOS. The BIOS can provide a indications to the BMC that a session for changing functions of the BIOS has been started, that one or more changes to the functions has occurred, and that the session has been completed. The BMC receives the session start indication, at least one of the change indications, and an event indication that an event has occurred on the information handling system that has interrupted the session before the BIOS sends the session end indication. Subsequent to the event, the BMC provides a session interrupted indication that the session was interrupted and the at least one change indication to the BIOS. The BIOS restarts the session in response to receiving the session interrupted indication and re-executes the change to the function indicated by the at least one change indication.

20 Claims, 4 Drawing Sheets

MANAGED AUTO-RESUME FOR INTERRUPTED BIOS PROCESSES

FIELD OF THE DISCLOSURE

This disclosure generally relates to information handling systems, and more particularly relates to managed auto-resume for interrupted BIOS processes.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a BMC and a host processing system with a BIOS. The BIOS can provide a indications to the BMC that a session for changing functions of the BIOS has been started, that one or more changes to the functions has occurred, and that the session has been completed. The BMC may receive the session start indication, at least one of the change indications, and an event indication that an event has occurred on the information handling system that has interrupted the session before the BIOS sends the session end indication. Subsequent to the event, the BMC may provide a session interrupted indication that the session was interrupted and the at least one change indication to the BIOS. The BIOS may restart the session in response to receiving the session interrupted indication and re-execute the change to the function indicated by the at least one change indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
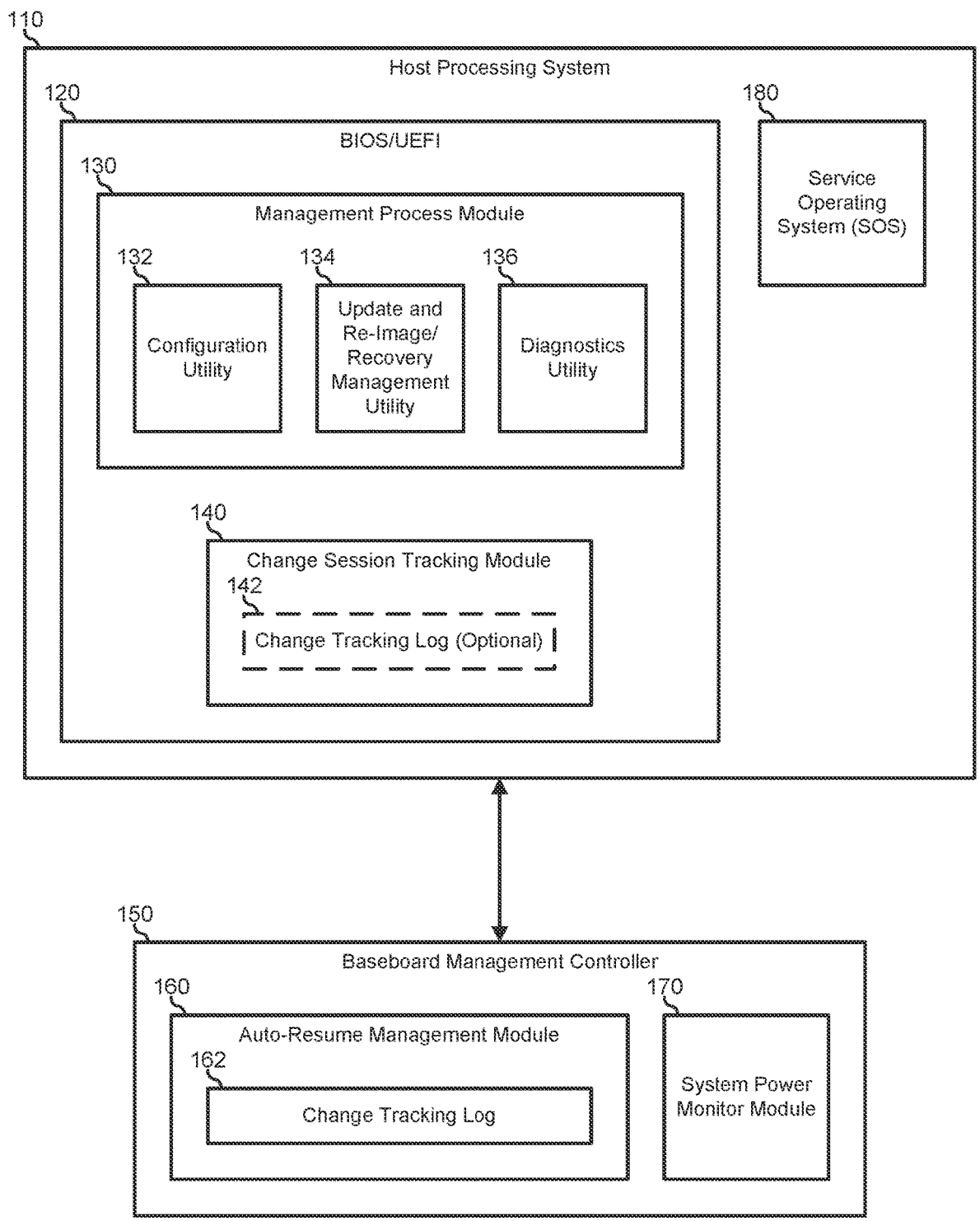
FIG. 1 is a block diagram illustrating an information handling system according to an embodiment of the current disclosure.

FIG. 1 illustrates an information handling system 100 including a host processing system 110 and a baseboard management controller (BMC) 150. Host system 110 represents those portions of information handling system 100 that are associated with the processing functions and features for which the information handling system is typically employed, such as the instantiation of a Basic Input/Output System (BIOS)/Universal Extensible Firmware Interface (UEFI) 120, a service operating system (SOS) 180, an operating system (OS), the execution of various applications, programs, utilities, or the like. As such, host system 110 may include hardware elements such as those described with respect to information handling system 300 in FIG. 4, as described below. BMC 150 represents a processing system of information handling system 100 that provides an out-of-band (OOB) mechanism to retrieve information related to the operation of host processing system 110, to provide updates to BIOS/UEFI 120 or system firmware updates, to manage non-processing components of the information handling system, such as system cooling fans and power supplies, event management and logging, and the like. As such, BMC 150 may represent one or more processing devices, such as a dedicated BMC System-on-a-Chip (SoC) device, one or more associated memory devices, one or more network interface devices, a complex programmable logic device (CPLD), and the like, that operate together to provide the management environment for information handling system 100.

BIOS/UEFI 120 includes a management process module 130 and a process tracking module 140 (hereinafter referred to as "tracking module 140"). Management process module 130 represents various elements of BIOS/UEFI 120 that are invoked to monitor, manage, and maintain the operating state of the BIOS/UEFI and of information handling system 100. In particular, management process module 130 includes a configuration utility 132, an update and re-image/recovery management utility 134 (hereinafter referred to as "update utility 134"), and a diagnostics utility 136. Configuration utility 132 represents a utility instantiated in the code of BIOS/UEFI 120 that provides a graphical user interface (GUI) that permits the manipulation of the various functional and feature options of the BIOS/UEFI, and is typically accessed early in a system boot operational phase of information handling system 100.

Update utility 134 represents a utility instantiated in the code of BIOS/UEFI 120 that provides functions and procedures to update the BIOS/UEFI code, or other firmware elements of information handling system, to re-image a boot image of information handling system 100, to recover the information handling system or the BIOS/UEFI to a previously operable state. The procedures to update the BIOS/UEFI code or other firmware elements may be invoked to bring older versions of the code to updated standards in order to maintain information handling system 100 in an optimal and secure operating state. The procedures to re-image the boot image of information handling system 100 may be invoked to restore the information handling system to a factory default state, to instantiate a different or additional OS on the information handling system, to otherwise repurpose the operating environment of the information handling system, or to otherwise restore or modify the boot image of the information handling system, as needed or desired.

The procedures to recover information handling system 100 or BIOS/UEFI 120 to a previously operable state may be invoked in response to changes to the information handling system or the BIOS/UEFI that were either unsuccessful or harmful to the operating state of the information handling system or the BIOS/UEFI. In this regard, update utility 134 will be understood to include a logging or recoverable state tracking mechanism that identifies previous operating states that may be selected and to which the information handling system or BIOS/UEFI is recovered to. In performing the functions and features of update utility 134, it will be understood that management process module 130 may include functionality that permits the update utility to access network-based resources through a network interface device of host processing system 110, as needed or desired. For example, BIOS/UEFI firmware updates, boot images, recovery states, or the like, may be stored externally to information handling system 100, such as at a predetermined network location or web site, and such location or web site may be accessed by update utility 134 to perform the update activities, as needed or desired.

Diagnostics utility 136 represents a utility instantiated in the code of BIOS/UEFI 120 that provides functions and procedures to diagnose the operating state of information handling system 100 and of BIOS/UEFI 120. The details of BIOS/UEFI operations, and particularly of BIOS/UEFI configuration, update, and diagnostics, are known in the art and will not be described further herein, except as may be needed to illustrate the current embodiments. BMC 150 includes an auto-resume management module 160 (hereinafter referred to as "auto-resume module 160") and a system power monitor module 170 (hereinafter referred to as "power module 170"). Auto-resume module 160 includes a change tracking log 162 (hereinafter referred to as "log 162"). The functions and features of auto-resume module 160, log 162, and power module 170 will be described further below.

It has been understood by the inventors of the current disclosure that changes to the BIOS/UEFI of an information handling system typically occurs in sessions that take a long time to complete. For example, where a user invokes a configuration utility, the user may have a long list of updates to be implemented on multiple interface pages of the configuration utility GUI. Similarly update procedures typically involve the downloading of large BIOS/UEFI or firmware update files, image or recovery files, or the like. For example, an image restore process may include 1) the user pressing a particular function key to enter a management process launchpad, 2) clicking a support option, 3) clicking an "OS Recovery" option, 4) selecting a restore/re-image option, 5) selecting a partition, 5) connecting to a backend server (such as by entering a WiFi SSID and password), 6) starting the recovery image download, and 7) (after a long duration download process) rebooting the information handling system. As used herein, a user of information handling system 100 may represent a human actor that acts upon BIOS/UEFI 120, such as a system administrator or the like, an automated process that acts upon the BIOS/UEFI settings, such as a script or program executed automatically within the information handling system or from an external BIOS/UEFI management agent, or any other actor that can function to make changes to the BIOS/UEFI, as needed or desired.

It has been further understood that such long durations of time for the change sessions leaves the information handling system exposed to disruptive events, such as power failures or other types of events which may disrupt the change sessions. In particular, a disrupted change session may result in the loss of changes made within the BIOS/UEFI GUI, but not yet committed to be enacted setting changes, the partial downloading of updates, and images, and the like. Examples of procedures that may be interrupted by various disruptive events may include a user updating various BIOS/UEFI settings across the multiple GUI configuration screens, the user performing a BIOS "load defaults" operation, the user attempting a local flash recovery operation resulting in flash corruption, the user attempting to re-image the OS factory image on the hard drive within an operating environment such as SOS 180, or the like. In any of these cases, a disruptive event may result in the user having to repeat all of the steps previously taken in order to achieve the desired operational BIOS/UEFI state.

In a particular embodiment, tracking module 140 further operates to provide change indications to BMC 150 that indicate the progress of the changes performed during the change session. Here, when a user of information handling system 100 initiates a change session through management process module 130, the management process module provides a session type indication indicating the type of change session that was initiated (i.e., through which one of configuration utility 132, update utility 134, and diagnostics utility 136) to tracking module 140, provides periodic change indications to the tracking module indicating the progress of the changes performed during the change session, and provides a session end indication to the tracking module when the change session is completed.

In particular, when configuration utility 132 is invoked, management process module 130 provides a session type indication indicating that the change session is a configuration change session, and, as the user makes changes to the BIOS/UEFI settings, provides change indications that include the specific changes made. When the user ends the change session, such as by initiating a system re-boot from the GUI, management process module 130 provides a session end indication to tracking module 140.

When update utility 134 is invoked, management process module 130 provides a session type indication indicating that the change session is an update change session, and, as the update session proceeds, provides change indications that include the progress of the update session. For example, change indications may be provided when the user enters update utility 134, when the user selects a type of update (e.g., BIOS/UEFI update process, re-image process, or recovery process), when the user selects a source location for the update, when the user enters login credentials for the selected location, when a download is initiated, various download progress indications, when the download is completed, when the download is successfully installed, or other change indications as needed or desired. When the user ends the change session, such as by initiating a system re-boot, management process module 130 provides a session end indication to tracking module 140.

When diagnostics utility 136 is invoked, management process module 130 provides a session type indication indicating that the change session is a diagnostic session, and, as the diagnostic session proceeds, provides change indications that indicate the progress of the diagnostic session. For example, change indications may be provided when the user enters diagnostic utility 134, when the user selects a type of diagnostic (e.g., evaluation of current BIOS/UEFI settings versus recommended settings, troubleshooting of particular sub-systems of information handling system 100, or other diagnostics as needed or desired), a result from the particular diagnostic, or the like. When the user ends the diagnostic session, such as by exiting diagnostic utility 136 or by initiating a system re-boot, management process module 130 provides a session end indication to tracking module 140.

In a particular embodiment, initiated in response to receiving a session type indication from management process module 130, tracking module 140 operates to provide a session start indication to auto-resume module 160 indicating that a change session has been started, to provide the associated session change indications to the auto-resume module, and to provide the session end indication from the management process module to the auto-resume module. Auto-resume module 160 stores the change indications in log 162. Auto-resume module 160 then operates to manage the operating state of information handling system 100, and particularly of power module 170 to determine whether or not the change session was completed normally, that is, that the session end indication was received from tracking module 140 without the occurrence of any disruptive events. If no disruptive events are detected by auto-resume module 160 before a session end indication is received, then auto-resume module 160 determines that the change session was successfully completed, and no further action with regard to the change session is taken by the auto-resume module.

On the other hand, if a disruptive event is detected by auto-resume module 162 prior to receiving the session end indication from tracking module 142, then auto-resume module 160 determines that the change session was not completed successfully, but was interrupted prior to the completion of the change session. In a particular case, the detection of the disruptive event includes receiving a power-loss indication from power module 170. Power module 170 is configured to determine a difference between an expected power loss case, such as for a user-initiated system re-boot, or another BIOS/UEFI or OS instituted power cycle event, and an unexpected power loss case, such as in response to the loss of a POWER_GOOD signal from a power supply of information handling system 100, or the like. When the disruption of a change session is detected by auto-resume module 162, the auto-resume module stores event disruption information that identifies the change session and the fact that the change session was disrupted in a non-volatile memory device of BMC 150.

Then, on a next power-on event for information handling system 100, BMC 150 provides the event disruption information to tracking module 140. For example, BMC 150 can provide the event disruption information to event tracking module 140 during a Power-On Self Test (POST) process of the re-boot process. In response, tracking module 140 operates to interrupt the POST process, and to direct management process module 130 to reinstitute the change session on the appropriate one of configuration utility 132, update utility 134, or diagnostics utility 136. Tracking module 140 further operates to request the change indications from log 162, and provides the change indications to management process module 130 as a "play-back" of the interrupted change session on the associated one of configuration utility 132, update utility 134, or diagnostics utility 136.

In this way, a disruptive event is handled on information handling system 100 with no extra effort on the part of the user of the information handling system. For example, where the change session invoked configuration utility 132, the user will have made a sequence of changes to the BIOS/UEFI settings up until the time of the disruptive event, but tracking module 140 will have reimplemented the changes up to the point of the disruptive event, and the user will be presented with the GUI page that was exhibited prior to the disruptive event as if no event had occurred. In a particular case, tracking module 140 may provide the use with a landing page that informs the user that the change session was interrupted, and to stand by while the tracking module performs the changes indicated by change indications in the background.

In another example, where the change session invoked update utility 134, the user will have taken steps to instigate the update, the re-image, or the recovery, up to, and including the download process. In this case, tracking module 140 operates to reestablish the connection to the appropriate network resource and to resume the download of the associated files, resuming from the point that the data connection was lost. Then, at whatever point that the disruptive event occurred in the update process, tracking module 140 restores control of the update process to complete the update normally. Similarly, where the change session invoked diagnostics utility 136, the user will have performed various diagnostic procedures, and tracking module 140 operates to upload the progress of the diagnostic session to the diagnostic utility, along with the diagnostic results, and the user will be presented with the GUI page that was exhibited prior to the disruptive event as if no event had occurred.

In the above embodiment, during the re-boot process of information handling system 100, tracking module 140 receives the change indications form log 162. In another embodiment, tracking module 140 includes a change tracking log 142 (hereinafter referred to as "log 142," illustrated here as being an optional item within the tracking module). In this embodiment, rather than providing the session change indications to BMC 150, tracking module 140 stores the session change indications received from management process module 130 in log 142. Here, no further communication between tracking module 140 and BMC 150 is needed after the BMC provides the indication that the prior change session was disrupted. In all other regards, tracking module 140 operates as described above.

In a particular embodiment, the change session on BIOS/UEFI 130 may be performed in the context of a session within SOS 180. Here it will be understood that SOS 180 represents an operating system that is utilized for system recover procedures system updates, or the like, which is typically instantiated by an OS loader in place of the typical run time OS. In particular cases, SOS 180 acts as the OS loader for the launching of the system OS, and can be directed to either launch the OS or enter a recovery/update process. In this embodiment, SOS 180 operates to provide a session start indication indicating that a change session has started, and, as the change session proceeds, provides change indications that include the progress of the change session. When the change session is ended, such as by initiating a system re-boot, the SOS provides a session end indication to tracking module 140.

In response to receiving a session start indication from SOS 180, tracking module 140 provides a session start indication to auto-resume module 160 indicating that a change session has been started, to provide the associated session change indications to the auto-resume module, and to provide the session end indication from the management process module to the auto-resume module. Auto-resume module 160 stores the change indications in log 162. Auto-resume module 160 then operates to manage the operating state of information handling system 100, and particularly of power module 170 to determine whether or not the change session was completed normally, that is, that the session end indication was received from tracking module 140 without the occurrence of any disruptive events. If no disruptive events are detected by auto-resume module 160 before a session end indication is received, then auto-resume module 160 determines that the change session was successfully completed, and no further action with regard to the change session is taken by the auto-resume module.

On the other hand, if a disruptive event is detected by auto-resume module 162 prior to receiving the session end indication from tracking module 142, then auto-resume module 160 determines that the change session was not completed successfully, but was interrupted prior to the completion of the change session. When the disruption of a change session is detected by auto-resume module 162, the auto-resume module stores event disruption information that identifies the change session and the fact that the change session was disrupted in a non-volatile memory device of BMC 150.

Then, on a next power-on event for information handling system 100, BMC 150 provides the event disruption information to tracking module 140. For example, BMC 150 can provide the event disruption information to event tracking module 140 during a Power-On Self Test (POST) process of the re-boot process. In response, tracking module 140 operates to launch SOS 180, and to direct the SOS reinstitute the change. Tracking module 140 further operates to request the change indications from log 162, and provides the change indications to SOS 180 as a "play-back" of the interrupted change session on the SOS.

Figure 2:
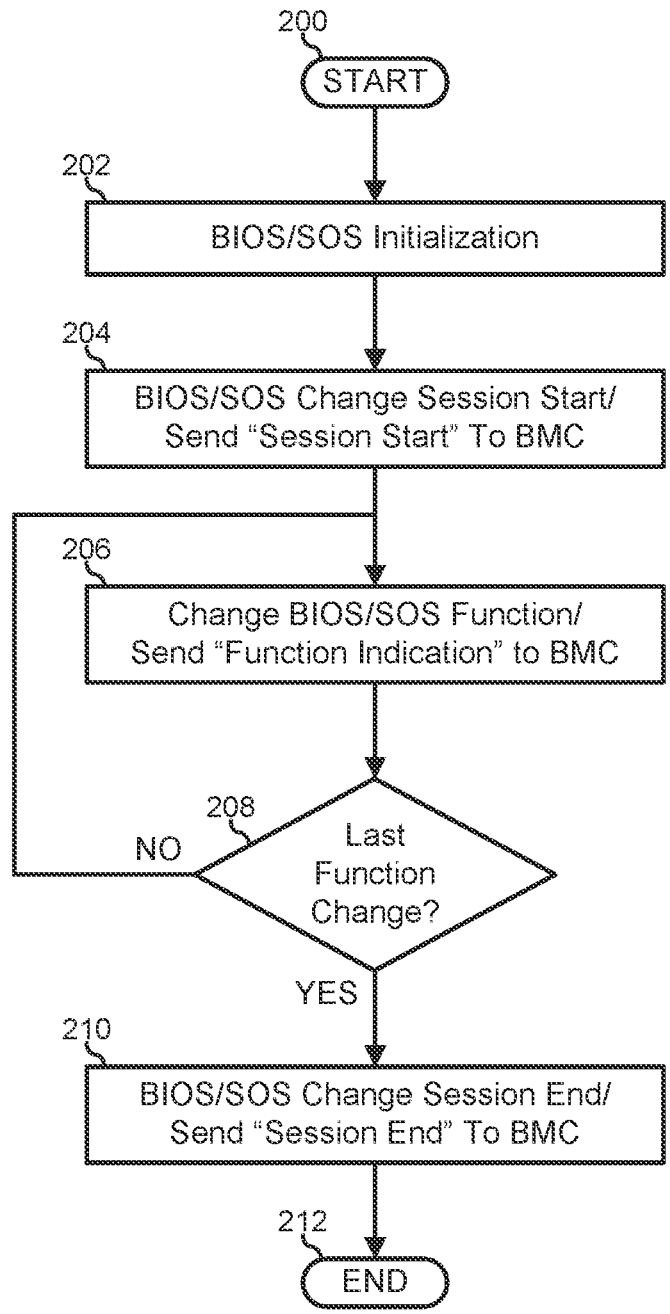
FIG. 2 is a flowchart illustrating a method for tracking the progress of a change session on an information handling system according to an embodiment of the current disclosure.

FIG. 2 illustrates a method for tracking the progress of a change session on an information handling system, starting at block 200. A BIOS/UEFI or SOS is launched on the information handling system in block 202. A change session is started on the BIOS/UEFI or SOS and a session start indication is provided to a BMC of the information handling system in block 204. A change is made to a BIOS/UEFI setting or function and a function change indication is provided to the BMC in block 206. A decision is made as to whether or not a last function change is made in the change session in decision block 208. If not, the "NO" branch of decision block 208 is taken and the method loops back to block 206 where additional function changes are made. When the last change function is made, the "YES" branch of decision block 208 is taken, the change session is ended and a session end indication is provided to the BMC in block 210, and the method ends in block 212.

Figure 3:
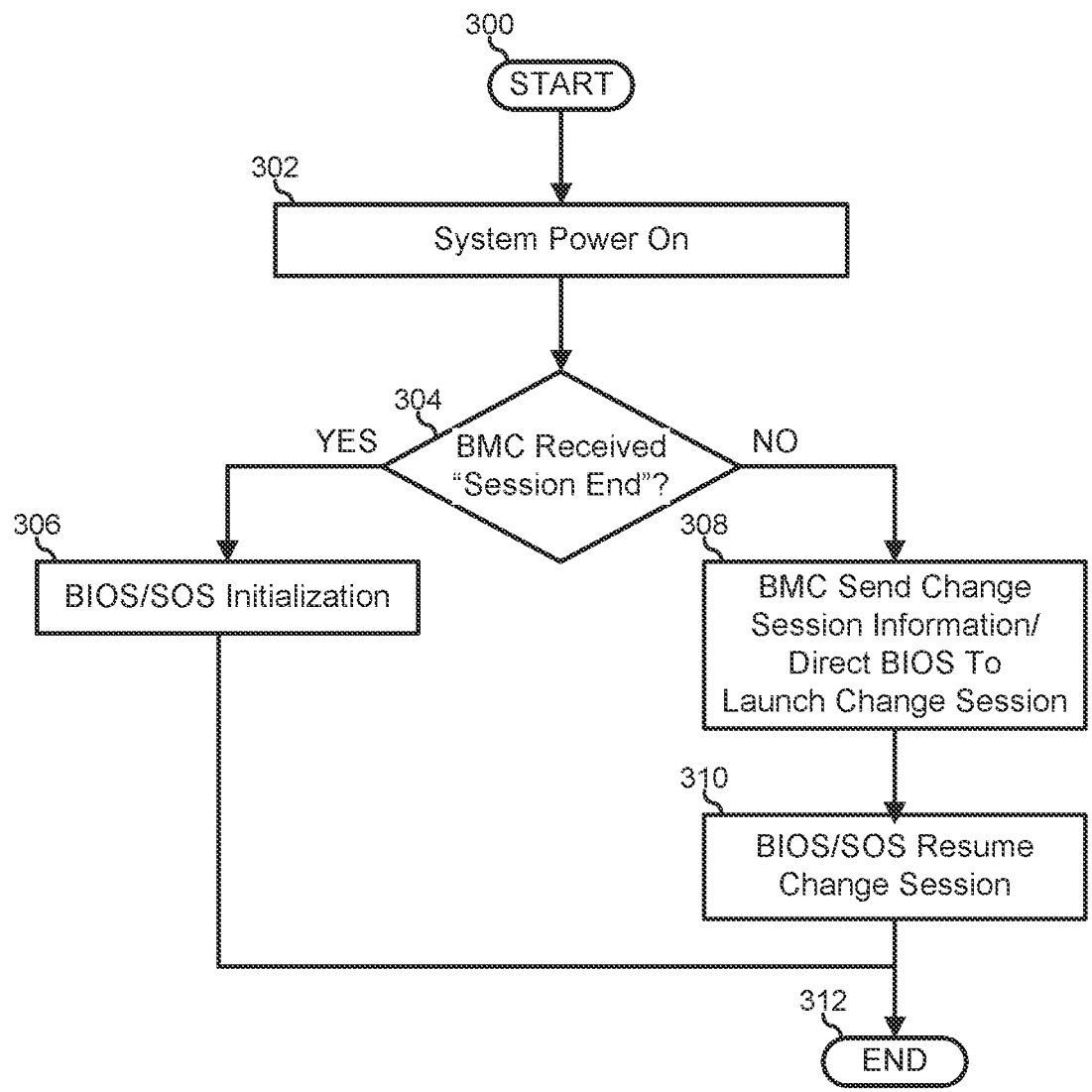
FIG. 3 is a flowchart illustrating a method for managing an auto-resume process for interrupted BIOS/UEFI change sessions according to an embodiment of the current disclosure.

FIG. 3 illustrates a method for managing an auto-resume process for interrupted BIOS/UEFI or SOS change sessions, starting at block 300. An information handling system is powered on in block 302, and a decision is made as to whether or not, after a start change session indication was received by a BMC, the BMC received an end change session indication in decision block 304. If so, the "YES" branch of decision block 304 is taken and the BIOS/UEFI or SOS proceeds to initialize the information handling system normally in block 306 and the method ends in block 312. If the BMC did not receive the end change session indication, the "NO" branch of decision block 304 is taken, and the BMC sends an indication that a change session was interrupted and the function changes performed in the interrupted change session to the BMC received an end change session indication the BMC received an end change session indication BIOS/UEFI or SOS, and directs the BIOS/UEFI or SOS to launch the change session in block 308. The BIOS/UEFI or SOS resumes the change session in block 310 and the method ends in block 312.

Figure 4:
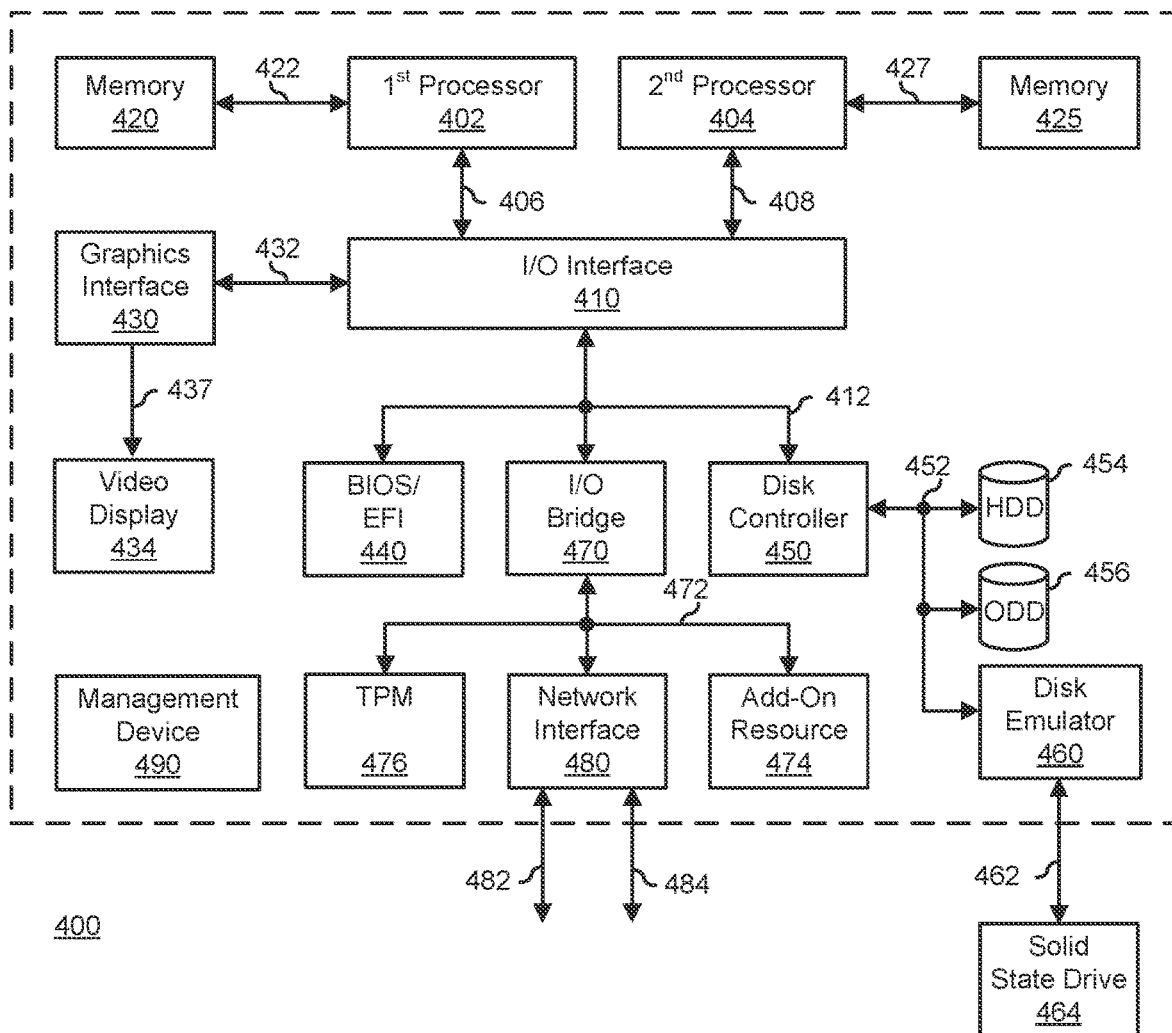
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/

UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a baseboard management controller (BMC); and
   a host processing system including a basic input/output system (BIOS) configured to provide a session start indication to the BMC that a session for changing one or more functions of the BIOS have been started, followed by one or more change indications to the BMC, each change indication being associated with a change to one of the functions, followed by a session end indication to the BMC that the session has been completed;
   wherein the BMC is configured to receive the session start indication, at least one of the change indications, and an event indication that an event has occurred on the information handling system that has interrupted the session before the BIOS sends the session end indication, and subsequent to the event, to provide a session interrupted indication that the session was interrupted and the at least one change indication to the BIOS; and
   wherein the BIOS is configured to restart the session in response to receiving the session interrupted indication and to re-execute the change to the function indicated by the at least one change indication.

2. The information handling system of claim 1, wherein the event includes an unexpected power cycle event.

3. The information handling system of claim 1, wherein the session includes a BIOS configuration session.

4. The information handling system of claim 3, wherein the change indication includes a BIOS setting change.

5. The information handling system of claim 1, wherein the session includes one of a BIOS update session, a system re-image session, and a system recovery session.

6. The information handling system of claim 5, wherein a first change indication includes a selection of a file destination.

7. The information handling system of claim 6, wherein a second change indication includes an indication of a log on to the file destination.

8. The information handling system of claim 7, wherein the change indication includes an indication that a file was downloaded from the file destination.

9. The information handling system of claim 1, wherein the session includes a diagnostics session.

10. The information handling system of claim 9, wherein the change indication includes a diagnostic result.

11. A method, comprising:
    providing, on an information handling system, a baseboard management controller (BMC);
    providing, on the information handling system, a host processing system;
    instantiating, on the host processing system, a basic input/output system (BIOS) configured to provide a session start indication to the BMC that a session for changing one or more functions of the BIOS have been started, followed by one or more change indications to the BMC, each change indication being associated with a change to one of the functions, followed by a session end indication to the BMC that the session has been completed;
    receiving, by the BMC, the session start indication, at least one of the change indications, and an event indication that an event has occurred on the information handling system that has interrupted the session before the BIOS sends the session end indication;
    subsequent to the event providing, by the BMC, a session interrupted indication that the session was interrupted and the at least one change indication to the BIOS; and
    in response to receiving the session interrupt indication:
       restarting, by the BIOS, the session; and
       re-executing the change to the function indicated by the at least one change indication.

12. The method of claim 11, wherein the event includes an unexpected power cycle event.

13. The method of claim 11, wherein the session includes a BIOS configuration session.

14. The method of claim 13, wherein the change indication includes a BIOS setting change.

15. The method of claim 11, wherein the session includes one of a BIOS update session, a system re-image session, and a system recovery session.

16. The method of claim 15, wherein a first change indication includes a selection of a file destination.

17. The method of claim 16, wherein a second change indication includes an indication of a log on to the file destination.

18. The method of claim 17, wherein the change indication includes an indication that a file was downloaded from the file destination.

19. The method of claim 11, wherein the session includes a diagnostics session.

20. An information handling system, comprising:
    a baseboard management controller (BMC); and
    a host processing system including a basic input/output system (BIOS) configured to provide a session start indication to the BMC that a session for changing one or more functions of the BIOS have been started, to log one or more change indications to the BMC, each change indication being associated with a change to one of the functions, and to provide a session end indication to the BMC that the session has been completed;
    wherein the BMC is configured to receive the session start indication and an event indication that an event has occurred on the information handling system that has interrupted the session before the BIOS sends the session end indication and, subsequent to the event, to provide a session interrupted indication that the session was interrupted; and wherein the BIOS is configured to restart the session in response to receiving the session interrupted indication and to re-execute each change to the function indicated by the at least one change indication.

\* \* \* \* \*